United States Patent [19]

Surovikin et al.

[11] Patent Number: 4,978,649
[45] Date of Patent: Dec. 18, 1990

[54] POROUS CARBONACEOUS MATERIAL

[76] Inventors: Vitaly F. Surovikin, Lermontova, 20, kv. 80; Georgy V. Plaxin, Rokossovskogo, 8, korpus 2, kv. 105, both of Omsk; Vladimir A. Semikolenov, Vyazemskogo, 2, kv. 11; Vladimir A. Likholobov, Detsky prospekt, 8, kv. 9, both of Novosibirsk; Ilona J. Tiunova, Lukashevicha, 27, kv. 133, Omsk, all of U.S.S.R.

[21] Appl. No.: 340,893

[22] Filed: Apr. 19, 1989

[30] Foreign Application Priority Data

Apr. 19, 1988 [SU] U.S.S.R. .......................... 4443666[U]

[51] Int. Cl.$^5$ ...................... C01B 31/10; B01J 20/20; B01J 21/18; C09C 1/48
[52] U.S. Cl. ................................ 502/416; 264/29.1; 264/29.5; 423/445; 423/454; 423/458; 502/180; 502/185; 502/417; 502/431; 502/432; 502/433; 502/437; 562/511; 564/305
[58] Field of Search ............... 502/416, 437, 430–432, 502/180, 417, 433, 434, 438, 428; 423/447.3, 453, 454, 458; 264/29.5, 29.1, 29.3, 29.6

[56] References Cited

U.S. PATENT DOCUMENTS

| | | | |
|---|---|---|---|
| 2,719,779 | 10/1955 | Bray et al. | 423/454 |
| 3,260,664 | 7/1966 | Bokros et al. | 502/416 |
| 3,533,961 | 10/1970 | Voet et al. | 252/421 |
| 4,029,600 | 6/1977 | Schmit, Jr. et al. | 252/444 |

OTHER PUBLICATIONS

Carbon (1978) Pergarmon Press Ltd.—vol. 16, No. 2, pp. 149-152—"Etude Du Depot De Pyrocarbone Sur Des Noirs De Carbone," by Henri Colin & Georges Guichon.

Primary Examiner—Paul E. Konopka
Attorney, Agent, or Firm—Burgess, Ryan & Wayne

[57] ABSTRACT

The present invention relates to physical chemistry.

The material is made as a three-dimensional matrix with a pore volume of from 0.2 to 1.7 cm$^3$/g. The matrix is formed by bent layers of carbon of 100-10,000 Å thickness and 100-10000 Å radius of curvature. The true density of the material according to the present invention is 1.80-2.10 g/cm$^3$, its X-ray density is 2.112-2.236 g/cm$^3$, the pore size distribution has its maximum within the range of 200-2,000 Å.

The present invention can be useful in, for example, in the production of catalysts.

4 Claims, 1 Drawing Sheet

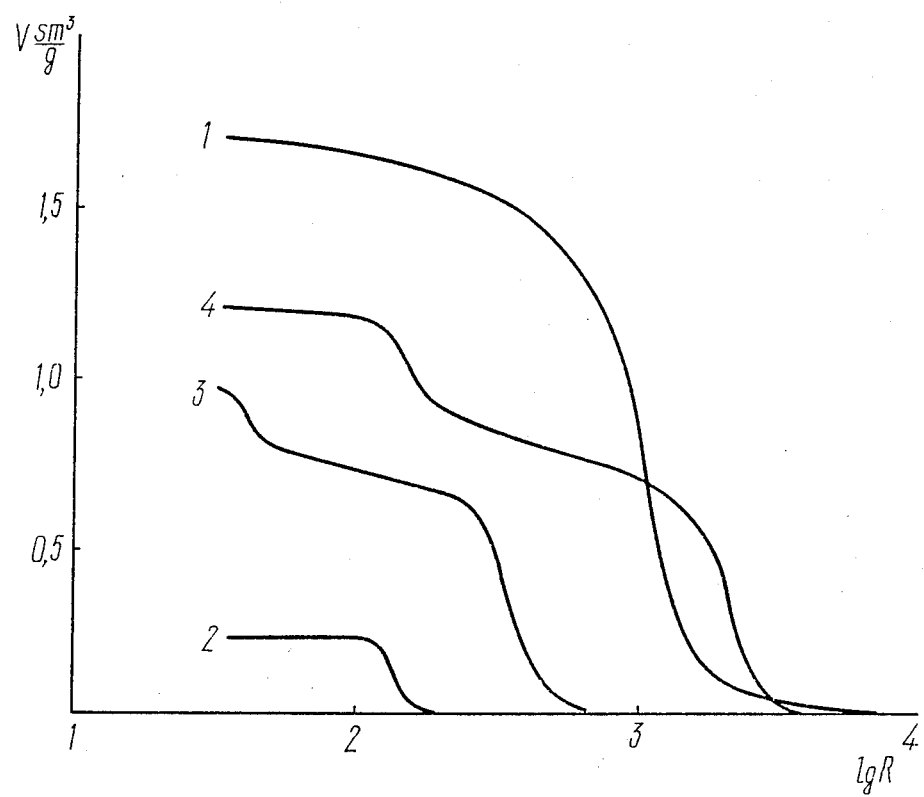

POROUS CARBONACEOUS MATERIAL

BACKGROUND OF THE INVENTION (1) Field of the Invention

The present invention relates to physical chemistry and, more particularly, to porous carbonaceous materials.

The present invention can be useful in the production of carbon adsorbents and catalysts for various chemical processes.

(2) Description of the Related Art

Known in the art are porous carbonaceous materials-active carbons employed as carriers and adsorbents. Active carbons are produced from charcoal by way of moulding thereof with a binder, followed by carbonization of the binder and a high-temperature vapour-gas activation. For example, large-size carbon particles with a low specific surface area are mixed with disintegrated coal pitch. The mixture is granulated in the form of beads, dried, carbonized and activated by steam. Such active carbons have but limited applications as carriers and adsorbents due to low mechanical-strength characteristics, a high content of ash and a broad pore-size distribution with a high proportion of pores with a size of less than 20 Å (U.S., A, No. 3533961).

Known in the art is a porous carbonaceous material comprising a three-dimentional matrix formed by spherically-shaped particles of carbon black bonded by a carbonaceous binder. The porous carbonaceous material has a pore volume of at least 0.2 cm$^3$/g, a specific surface area of over 100 m$^2$/g, a narrow pore size distribution in which at least 45% of their total surface area are accounted for by pores with a size of 20 Å and more, and the distribution maximum is within the range of 40 to 60 Å (U.S., A, No. 4029600).

This prior art carbonaceous material has a disadvantage residing in a low mechanical strength comparable with that of active carbons. The mechanical strength of a carbonaceous material at a binder content of up to 50% by mass exceeds that of granulated carbon black without a binder only by 6-6.5 times. Furthermore, impurities can be introduced into the carbonaceous material in the preparation thereof along with the binder. In particular, a binder based on polymers of furfuryl alcohol can also incorporate sulphur which is a strong catalytic poison. In the known carbonaceous material pores with a size of 20 to 200 Å account for 40% of the specific surface area. However, the reference teaches that the maximum of pore size distribution is within the range of from 25 to 190 Å. Therefore, the known carbonaceous material has lower mechanical strength characteristics and a smaller volume of pores with a size above 200 Å that play an important role in processes of mass transfer in catalysis and absorption.

SUMMARY OF THE INVENTION

It is an object of the present invention to improve mechanical strength characteristics of a porous carbonaceous material at an increased proportion, therein, of pores with a size of more than 200 Å.

This object is accomplished by providing in a porous carbonaceous material in the form of a three-dimensional matrix with a pore volume of 0.2-1.7 cm$^3$/g, and wherein according to the present invention, the matrix is formed by bent carbon layers with a thickness of 100 to 10,000 Å and a radius of curvature of from 100 to 10,000 Å, a true density of 1.80 to 2.10 g/cm$^3$, an X-ray density of 2.112-2.236 g/cm$^3$ and the pore size distribution has its maximum within the range of from 200 to 2,000 Å.

It is advisable that the pore size distribution would have an additional maximum within the range of 40-200 Å.

The porous carbonaceous material according to the present invention has improved mechanical strength characteristics at an increased volume of pores with a size exceeding 200 Å.

Moreover, the porous carbonaceous material according to the present invention is heat-resistant and retains a porous structure in an inert atmosphere at a temperature of up to 1,000°-1,500° C., it is not pyrophoric and has a reduced content of mineral impurities and sulphur.

The material according to the present invention can have pores with an additional maximum of pore size distribution within the range of 40 to 200 Å pore size. In this case the material according to the present invention has a biporous structure, e.g. large-size pores are formed by bent layers of carbon, while small ones are located within the bent layers of the carbonaceous materials.

The porous carbonaceous material according to the present invention is distinguished by a combination of a high-adsorption surface formed by pores with a size of 40-200 Å with the ability of a rapid transportation of reacting molecules along large-size pores with a size of from 200 to 2,000 Å which provides an additional positive effect in comparison with monoporous adsorbents. The porous carbonaceous material according to the present invention can be prepared in the form of fine powders, granules, particles of a sophisticated shape (beads, tablets, cylinders and the like) of a different size.

The porous carbonaceous material can be used as a carrier for the preparation of a wide range of supported catalysts with different active components such as metals of Group VIII of the periodic system, namely: palladium, platinum, nickel, cobalt and the like, as well as other active metals and compounds thereof. At the present time catalysts are prepared on the basis of the porous carbonaceous material according to the present invention which have been studied in the following chemical reactions:

processes of a selective hydrogenation (nitrobenzotrifluoride into aminobenzotrifluoride; -o-nitrophenol into o-aminophenol; crotonaldehyde; benzoic acid into cycloxehanecarboxylic acid);

hydropurification of olefins from acetylene compounds, terephthalic acid from p-carboxybenzaldehyde, petroleum fractions from sulphur compounds;

oxidation of sulphide compounds in the manufacture of pulp, acetoxylation of ethylene and propylene in the production of glycols;

processes for producing anilines from phenols.

The catalyst based on the carbonaceous carried according to the present invention can be also used in a number of other chemical processes.

BRIEF DESCRIPTION OF THE DRAWING

The drawing illustrates curves of the logarithm of pore size distribution plotted against specific pore volume.

DETAILED DESCRIPTION OF THE INVENTION

The porous carbonaceous material according to the present invention has the following characteristics:
appearance: powder or rounded granules of 0.1 to 10.0 mm in diameter;
bulk density, g/cm$^3$: 0.2–1.0
crushing strength, MPa: 2.0–80.0
specific surface area, as for argon adsorption, m$^2$/g: 20–1,200
ash content, % max.: 1.0.

According to the data obtained by transmitting and scanning microscopy, the porous carbonaceous material according to the present invention comprises a three-dimensional matrix formed by bent layers of carbon of a thickness ranging from 100 to 10,000 Å and a radius of curvature of 100 to 10,000 Å. The porous carbonaceous material of the present invention has a true density of 1.80 to 2.10 g/cm$^3$ and an X-ray density of 2.112 to 2.236 g/cm$^3$.

The matrix formed by bent carbon layers with a radius of curvature of from 100 to 10,000 Å ensures a narrow pore distribution and has its maximum within the range of from 200 to 2,000 Å.

The porous carbonaceous material in the form of a matrix formed by bent carbon layers with a thickness of less than 100 Å and a radius of curvature less than 100 Å would have low exploitation properties, e.g. an insufficient mechanical strength, thus resulting in a shortened service life of adsorbents and catalysts.

The porous carbonaceous material in the form of a matrix formed by bent carbon layers with a thickness of above 10,000 Å and a curvature radius of over 10,000 Å has low adsorption characteristics and a small pore volume.

Therefore, the porous carbonaceous material according to the present invention in the form of a matrix formed by bent carbon layers of 100–10,000 Å thickness and a curvature radius of 100–10,000 Å has a maximum efficiency owing to an optimal combination of adsorption and mechanical-strength characteristics.

In the processes of adsorption and catalysts based, to a great extent, on phenomena of mass transfer of the reagents the most effective are porous materials with a range of the pore size of from 200 to 2,000 Å, since in this range the processes of mass transfer of reacting molecules occur most effectively and the carbonaceous carriers simultaneously exhibit high adsorption characteristics.

Pores with a size of more than 2,000 Å perform mainly transportation functions, since their surface area is insignificant as compared to the total surface area of the pores of the material according to the present invention. In the case of a monoporous adsorbent with a pore size of less than 100 Å the efficiency of utilization of the surface and of the deposited active components is decreased due to intradiffusion complications.

The use of the porous carbonaceous material according to the present invention with a true density of 1.80–2.10 cm$^3$/g an X-ray density of 2.112–2.236 g/cm$^3$ ensures both maximum mechanical-strength characteristics and a specific character of the surface contributing to improvement of adsorption characteristics of materials and adsorbents, as well as exploitation characteristics of catalysts (activity, selectivity, stability).

The production of a porous carbonaceous material with a true density of more than 2.10 g/cm$^3$ and an X-ray density of more than 2.236 g/cm$^3$ is associated with certain difficulties, since in this case values of density will approach those theoretically possible (2.260 and 2.267 g/cm$^3$ respectively) for a given modification of the carbonaceous material.

The porous carbonaceous material with a true density of below 1.80 g/cm$^3$ and an X-ray density of less than 2.112 g/cm$^3$ has low mechanical-strength characteristics due to the origination, in its structure, of a great number of defects. Furthermore, the presence of numerous defects (and of amorphous phase of carbon) impairs exploitation properties of the porous carbonaceous material and the activity of the components deposited on its surface.

The porous carbonaceous material according to the present invention is produced in any kind of reaction apparatus at a temperature within the range of from 750° to 1,200° C. having means for agitation of particles (fluidized bed, mechanical stirring, moving bed and the like).

Gaseous or vaporous carbon-containing compounds, e.g., hydrocarbons, are supplied into the intermixed layer of the starting carbonaceous material in the particulated or granulated form and heated to a temperature within the range of from 750° to 1,200° C. As a result of pyrolysis, pyrolytic carbon is deposited onto the surface of the carbonaceous material. Then a vapour-gas activator such as steam or steam-air mixture is fed into the intermixed layer of the carbonaceous material instead of the carbon-containing compounds and the carbonaceous material is treated therewith till the formation of the porous carbonaceous material according to the present invention, whereafter its structural and mechanical-strength characteristics are determined.

The radius of curvature and the thickness of carbon layers are determined by the method of electron microscopy.

The total volume of pores and the distribution of pore sizes are determined by the method of mercury porometry.

The relative crushing resistance is determined as the ratio of the mechanical strength of the material according to the present invention to the mechanical strength of granules of carbon black (with the particle diameter of 120 Å) produced under conditions similar to those of the prior art process (U.S., A, No. 4029600). The crushing strength of granules of the formed carbon black is equal to 0.25–0.30 MPa which was assumed as 100% in the determination of a relative mechanical strength of carbonaceous materials.

The catalyst produced on the basis of the porous carbonaceous material according to the present invention were tested in two model reactions of hydrogenation: of benzoic acid into cyclohexanecarboxylic acid and of nitrobenzotrifluoride into aminobenzotrifluoride.

The catalysts for the reaction of hydrogenation of benzoic acid were prepared according to the following procedure: to a suspension of a carbon carrier in water at the temperature of 20° C. a calculated amount of a solution of palladium hydrochloric acid was added, the solution pH was brought to 8.5 and palladium was reduced by sodium formate for 1 hour at the temperature of 60° C. The catalyst was washed with water to remove chlorine ions and dried. The content of palladium in the catalysts was 2% by mass. The catalyst tests for activity were carried out in an autoclave at the temperature of 170° under the pressure of hydrogen of 1.8 MPa. The amount of charged benzoic acid was 10 g, that of the catalyst —0.2 g. The activity was determined according to the relationship of the amount of adsorbed hydrogen vs. time in conversion of benzoic acid which was equal to 50% and expressed in the following units: g of benzoic acid/g of the catalyst per minute.

The catalyst for the reaction of hydrogenation of nitrobenzotrifluoride was prepared by depositing palladium acetate onto the porous carbonaceous material according to the present invention, followed by reduction of palladium with formic acid, rinsing and drying of the catalyst, wherein the content of palladium was 4% by mass.

The activity tests of the catalyst were carried out according to the following procedure. Charged into an autoclave were 0.2 g of the catalyst and 10 g of nitrobenzotrifluoride and hydrogenation was conducted under the constant pressure of hydrogen of 2.0 MPa and at the temperature of 80° C. The catalyst activity was determined by the rate of adsorption of hydrogen per 1 g of the catalyst in conversion of nitrobenzotrifluoride equal to 50% and was expressed in the following units: g-mol of hydrogen/g of the catalyst per minute.

The present invention is further illustrated by the following specific examples given with reference to the accompanying drawing, wherein there are shown integral curves of the pore size distribution; plotted against the axis of abscissae is the logarithm of the pore size and against the axis of ordinates-specific pore volume.

EXAMPLE 1

A porous carbonaceous material according to the present invention in the form of a three-dimensional matrix with the pore volume of 1.7 cm$^3$/g formed by bent carbon layers of 200–5,000 Å thickness with a radius of curvature of 200–5,000 Å, the true density of 2.028 g/cm$^3$, X-ray density of 2.217 g/cm$^3$ and with the pore size distribution having its maximum at 1,000 Å is obtained in a quartz reactor with the inside diameter of 90 mm. Charged into the reactor are 100 g of carbon black with the predominant particle size of 200 Å and then the reactor is set into a rotating motion at the angular speed of 2 $\pi$ rad/min. The reactor with carbon black is heated, by means of an external heater, to the temperature of 900° C. and into the bed of a continuously agitated carbon black a propane-butane mixture containing 50% by mass of butane is supplied at the flow rate of 176 l/h After treatment of carbon black for one hour steam is fed instead of the propane-butane mixture at the supply rate of 1 kg/kg of carbon per hour. As a result, the porous carbonaceous material according to the present invention is obtained. The results of its structural analysis and mechanical strength characteristics are shown in the Table hereinbelow. The pore size distribution curve is shown in FIG. 1.

EXAMPLE 2

A porous carbonaceous material according to the present invention in the form of a three-dimensional matrix with the pore volume of 0.2 cm$^3$/g formed by bent layers of carbon of 1,000–5,000 Å thickness, a radius of curvature of 100 to 5,000 Å, the true density of the material of 2.10 g/cm$^3$, its X-ray density of 2.236 g/cm$^3$ and with the pore size distribution having maximum at 200 Å is produced, analyzed and tested in a manner similar to that described in Example 1 hereinabove, except that the time of treatment of the carbon black with the propane-butane mixture is 6 hours and with steam —0.5 h.

The results of the structural analysis and mechanical strength characteristics of the thus-obtained porous carbonaceous material according to the present invention are shown in the Table hereinbelow. The pore size distribution curve is shown in FIG. 2.

EXAMPLE 3

A porous carbonaceous material according to the present invention in the form of a three-dimensional matrix with the pore volume of 1.54 cm$^3$/g formed by bent layers of carbon of 500–10,000 Å thickness and a radius of curvature of from 1,500 to 7,000 Å, the true density of 1.80 g/cm$^3$, the X-ray density of 2.112 g/cm$^3$ and with the pore size having its maximum at 2,000 Å is produced, analyzed and tested in a manner similar to that of Example 1, but the time of treatment of the carbon black with the propane-butane mixture is 0.5 hour. The results of the structural analysis and mechanical strength characteristics of the thus-produced porous carbonaceous material according to the present invention are shown in the Table hereinbelow.

EXAMPLE 4

A porous carbonaceous material according to the present invention in the form of a three-dimensional matrix with the pore volume of 1.6 cm$^3$/g formed by bent layers of carbon of 100–3,000 Å thickness and a radius of curvature of 100 to 10,000 Å, with the true density of 2.00 g/cm$^3$, the X-ray density of 2.212 g/cm$^3$ and with the pore size distribution having its maximum at 1,500 Å is produced, analyzed and tested in a manner similar to that described in Example 1 hereinbefore, except that the time of treatment of the carbon black with the propane-butane mixture is 2 hours. The results of the structural analysis and mechanical strength characteristics of the thus-produced porous carbonaceous material according to the present invention are shown in the Table hereinbelow.

EXAMPLE 5

A porous carbonaceous material in the form of a three-dimensional matrix with the pore volume of 0.22 cm$^3$/g formed by bent layers of carbon of 500–5,000 Å thickness and a radius of curvature of 100 to 1,000 Å, the true density of 1.97 g/cm$^3$, X-ray density of 2.193 g/cm$^3$ and the pore size distribution having its maximum at 480 Å and an additional maximum at 40 Å is obtained, analyzed and tested in a manner similar to that of Example 1, except that the time of treatment of the carbon black with the propane-butane mixture is 5 hours. The results of the structural analysis and mechanical strength characteristics of the porous carbonaceous material according to the present invention are shown in the Table hereinbelow.

EXAMPLE 6

A porous carbonaceous material according to the present invention in the form of a three-dimensional matrix with the pore volume of 0.93 cm$^3$/g formed by bent layers of carbon of 100 to 5,000 Å thickness and a radius of curvature of 200 to 5,000 Å, the true density of 2.00 g/cm$^3$ the X-ray density of 2.210 g/cm$^3$ and with the pore size distribution having its maximum at 480 Å and an additional maximum at 50 Å is produced, analyzed and tested in a manner similar to that of Example 1, except that the time of treatment of the carbon black with the propane-butane mixture is 5 hours and with steam—7 hours. The results of the structural analysis and mechanical strength characteristics of the thus-produced porous carbonaceous material according to the present invention are shown in the Table hereinbelow. The pore size distribution curve is shown in FIG. 3.

EXAMPLE 7

A porous carbonaceous material according to the present invention in the form of a three-dimensional matrix with the pore volume of 1.23 cm$^3$/g formed by bent layers of carbon of 200 to 9,000 Å thickness and a radius of curvature of 200 to 5,000 Å, the true density of 1.99 g/cm$^3$, X-ray density of 2.221 g/cm$^3$ and with the pore size distribution having its maximum at 2,000 Å and an additional maximum at 200 Å is produced, analyzed and tested in a manner similar to that described in Example 1 hereinbefore, except that the time of treatment of the carbon black with the propane-butane mixture is 5 hours and with steam—2 hours. The results of the structural analysis and mechanical strength characteristics of the thus-obtained porous carbonaceous material according to the present invention are shown in the Table hereinbelow. The pore size distribution curve is shown in FIG. 4.

bon black, to between 750° and 1,200° C., while continuously stirring the heated granules to prevent their sticking together, passing hydrocarbons through the mass of granules under conditions wherein said hydrocarbons decompose into carbon and deposit the carbon on the surface of the granules, and treating said granules with an activator gas comprising steam for 0.5 to 7 hours to form a pore volume of 0.2 to 1.7 cm$^3$/g and to increase the proportion of pores of a size of more than 200 Å.

2. A process as claimed in claim 1, wherein said activator gas is steam or a steam-air mixture.

3. A porous carbonaceous material prepared by the process of claim 1 in the form of a three-dimensional matrix with a pore volume of 0.2-1.7 cm$^3$/g formed by bent layers of carbon of 100-10,000 Å thickness and a radius of curvature of 100-10,000 Å, a true density of said material being equal to 1.80-2.10 g/cm$^3$, X-ray density—2.112-2.236 g/cm$^3$ and the pore size distribution having its maximum within the range of 200-2,000 Å.

4. A porous carbonaceous material according to claim 3, which is biporous and wherein the pore size distribution has an additional maximum within the range of 40-200 Å.

TABLE

| Porous carbonaceous material of Example No. | Time of treatment with Propane-butane mixture | Time of treatment with Steam | Relative crushing strength | Pore volume, cm$^3$/g | Layer thickness, Å | Radius of curvature of the layer, Å | Maximum pore size distribution, Å | Density, g/cm$^3$ True | Density, g/cm$^3$ X-ray | Catalyst activity in the reaction of hydrogenation of benzoic acid, g/g · min | Catalyst activity in the reaction of hydrogenation of nitrobenzotrifluoride, g-mol/g · min |
|---|---|---|---|---|---|---|---|---|---|---|---|
| 1 | 2 | 3 | 4 | 5 | 6 | 7 | 8 | 9 | 10 | 11 | 12 |
| 1 | 1 | 1 | 43 | 1.70 | 200–5000 | 200–5000 | 1000 | 2.02 | 2.217 | 0.24 | 0.063 |
| 2 | 6 | 0.5 | 160 | 0.21 | 1000–5000 | 100–5000 | 200 | 2.10 | 2.236 | 0.12 | 0.016 |
| 3 | 0.5 | 1 | 14 | 1.54 | 500–10000 | 1500–7000 | 2000 | 1.80 | 2.112 | 0.14 | 0.040 |
| 4 | 2 | 1 | 38 | 1.60 | 100–3000 | 100–10000 | 1500 | 2.00 | 2.212 | 0.20 | 0.051 |
| 5 | 5 | 1 | 167 | 0.22 | 500–5000 | 100–1000 | 40; 480 | 1.97 | 2.193 | 0.33 | 0.047 |
| 6 | 5 | 7 | 47 | 0.93 | 100–5000 | 200–5000 | 50; 480 | 2.00 | 2.210 | 0.35 | 0.068 |
| 7 | 5 | 2 | 126 | 1.23 | 200–9000 | 200–5000 | 200; 2000 | 1.99 | 2.221 | 0.23 | 0.066 |

What is claimed is:

1. A process for producing a porous carbonaceous material, comprising heating a mass of granules of car-